United States Patent [19]

Okabe

[11] 4,383,659
[45] May 17, 1983

[54] LOCKING DEVICE FOR SAFETY SEAT BELTS

[75] Inventor: Shinichi Okabe, Fujisawa, Japan

[73] Assignee: Nippon Seiko Kabushiki Kaisha, Tokyo, Japan

[21] Appl. No.: 239,498

[22] Filed: Mar. 2, 1981

[30] Foreign Application Priority Data

Mar. 15, 1980 [JP] Japan ................................. 55-33133

[51] Int. Cl.$^3$ .................. A62B 35/02; B65H 75/48
[52] U.S. Cl. .................................. 242/107.2; 188/65.1
[58] Field of Search .................... 242/107.2, 107.4 R, 242/107.4 E; 280/801, 803, 806–808; 297/474–480; 188/65.1

[56] References Cited

U.S. PATENT DOCUMENTS 3,930,622  1/1976  Tanaka et al. ............... 242/107.4 A
4,128,261 12/1978  Paitula ........................ 280/806 X
4,211,377  7/1980  Yasumatsu .................. 242/107.2
4,249,708  2/1981  Asano .......................... 242/107.2

FOREIGN PATENT DOCUMENTS 1146602  3/1969  United Kingdom .
1227981  4/1971  United Kingdom .

Primary Examiner—John M. Jillions
Attorney, Agent, or Firm—Henry T. Burke

[57] ABSTRACT

A locking device for safety seat belts comprises a base member, a drum base member rockably mounted on the base member, a drum rotatably mounted on the drum base member, engagement members integral with the drum, a lock member capable of assuming a locking position in which it engages the engagement members and a non-locking position in which it is not in engagement with the engagement members, an actuating member mounted on the drum base member so as to be capable of assuming a first position in which it has brought the lock member into the locking position and a second position in which it has brought the lock member into the non-locking position, the actuating member being biased toward the second postion, and a member secured to the base member and engageable with the actuating member to bring it from the second position to the first positon when the drum base member rocks during an emergency.

8 Claims, 3 Drawing Figures

FIG. 2
FIG. 3
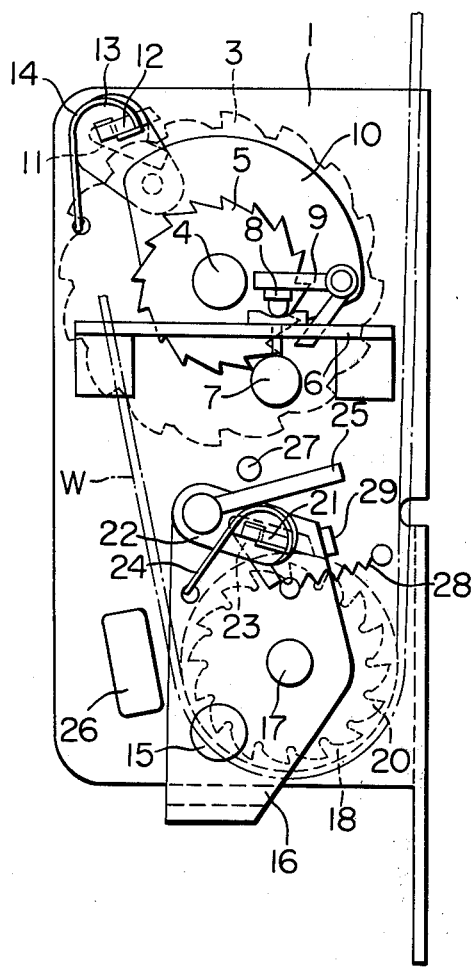
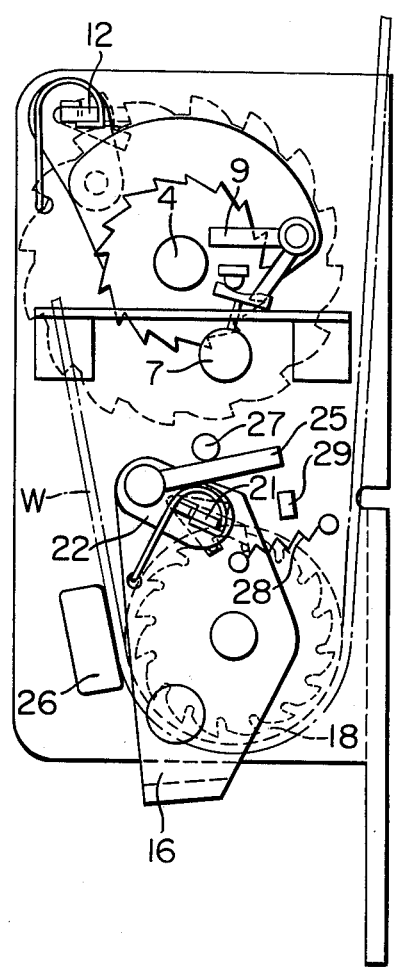

LOCKING DEVICE FOR SAFETY SEAT BELTS

BACKGROUND OF THE INVENTION

1. Field of the Invention

This invention relates to a locking device for preventing delay for the secure locking of the webbing for a seat belt occurring when the retractor for the webbing is initially locked during an emergency by an emergency locking mechanism of the retractor, thereby restraining the webbing quickly and reliably from being further drawn out when the retractor is locked.

2. Description of the Prior Art

As one type of such locking devices, there has heretofore been proposed a device in which, by utilization of the tension of the webbing during the emergency, a drum base member rotatably supporting a rotatable drum on which the webbing is wound partly is caused to rock about a pivot thereof and the webbing is held and restrained between the drum and a portion of a base member which rockably supports the drum base member. In such a type of locking device, when the webbing is held and restrained, both a shaft of the retractor on which the webbing is wound in layers and the aforementioned rotatable drum must be locked by some sensor or other which may sense an emergency. However, if an attempt is made to accomplish this by a single sensor, the construction of the sensor would become complicated and the reliability thereof would be reduced. Provision of discrete sensors would also encounter similar problems.

SUMMARY OF THE INVENTION

It is therefore an object of the present invention to provide a locking device which locks a rotatable drum during an emergency without using any sensor such as a device sensing a change in the acceleration of the vehicle.

This invention will become fully apparent from the following detailed description thereof taken in conjunction with the accompanying drawings.

BRIEF DESCRIPTION OF THE DRAWINGS

FIGS. 2 and 3 are side views illustrating the operation of this embodiment.

DESCRIPTION OF THE PREFERRED EMBODIMENTS

Figure 1:
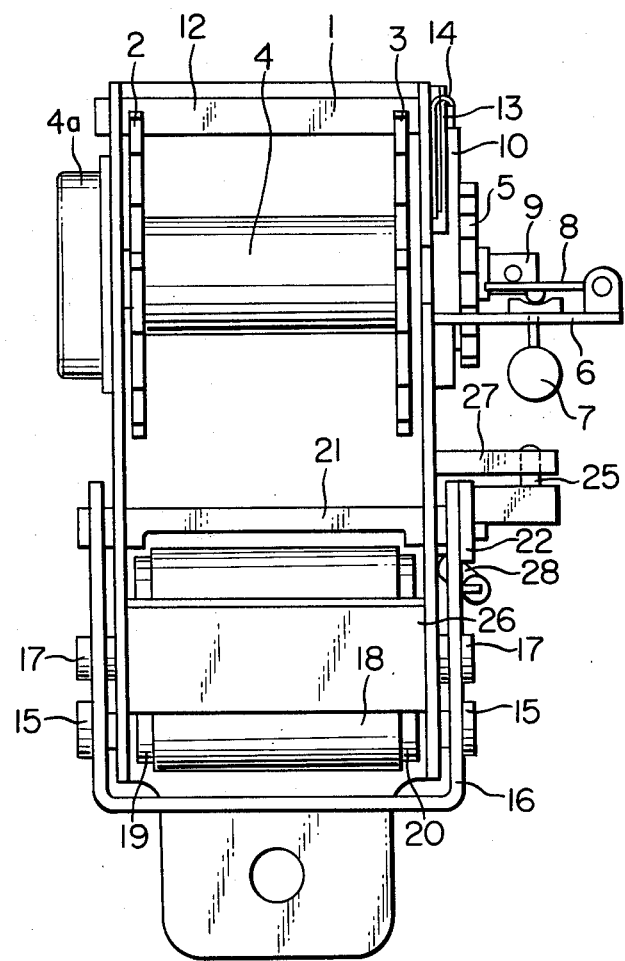
FIG. 1 is a front view of an embodiment of the present invention.

The embodiment shown in the drawings is provided on a base member 1 common to that of a vehicle speed change sensing type emergency locking retractor.

The retractor portion will first be described. On the base member 1, a shaft 4 having ratchet wheels 2 and 3 secured to the end portions thereof is rotatable supported while being biased in a webbing take-up direction by a biasing spring (not shown) within a cover 4a, and a smaller ratchet wheel 5 is integrally mounted on one end of the shaft 4 which extends outwardly of the base member 1. A pendulum member 7 for sensing any speed change of a vehicle greater than a predetermined value is suspended on a supporting portion 6 secured to the base member 1, and the movement thereof may be transmitted to a pawl member 9 through an arm member 8 rockably supported on the supporting portion 6. The pawl member 9 is rockably mounted on a sector member 10 loosely fitted on the end portion of the shaft 4 adjacent to the smaller ratchet wheel 5. Rockably mounted on the sector member 10 is a plate 13 integral with a lock plate 12 tiltably supported in a sector hole 11 formed in the base member 1, the lock plate 12 being biased by a spring 14 toward a position in which the lock plate 12 is not engaged with the ratchet wheels 2 and 3.

Thus, webbing W can normally be freely drawn out from the shaft 4 against the force of the take-up spring, but when the pendulum member 7 swings during the emergency, the pawl member 9 will come into mesh engagement with the smaller ratchet wheel 5, whereby the rotational force of the wheel 5 in a webbing draw-out direction will be transmitted to the sector member 10 through the pawl member 9. Consequently, the sector member 10 will be rotated counterclockwisely about the shaft 4 as viewed in FIG. 2 and the lock plate 12 will be brought into mesh engagement with the ratchet wheels 2 and 3 through the plate 13 against the biasing force of the spring 14. In this manner, the locking of the shaft 4 during the emergency may be accomplished.

The locking device portion will now be described.

A drum base member 16 is mounted on the above-described base member 1 for rocking movement about a pair of aligned shaft members 15, and a drum 18 is mounted on the drum base member 16 for rotation about a shaft 17. Ratchet wheels 19 and 20 are integrally mounted on the opposite ends of the drum 18. A plate 22 integral with a second lock plate 21 is rockably mounted on the upper portion of the drum base member 16. The second lock plate 21 is tiltably supported in a sector hole 23 formed in the drum base member 16, and is biased by a spring 24 toward a position in which the second lock plate 21 is not engaged with the ratchet wheels 19 and 20. A spring 28 is extended between the drum base member 16 and the base member 1, whereby the drum base member 16 is biased toward a position in which it abuts against a stopper 29 secured to the base member 1.

The shaft 17 of the drum 18 and the second lock plate 21 extend through the base member 1 and may move relative thereto and therefore, of course, suitably configured holes are formed in the base member 1 so as to permit their movements.

A bar 25 is secured to the plate 22 and adapted to bear against a projection 27 studded in the base member 1 when the drum base member 16 rocks toward a webbing holding plate 26 secured to the base member 1.

Operation of the embodiment having the above-described construction will now be described.

The webbing W drawn out from the shaft 4 is wound on the drum 18 partly and extends outwardly. In a normal condition, there is a sufficient gap between the drum 18 and the plate 26 and the drum 18 rotates smoothly, so that the webbing W can be drawn out and taken up normally. At this time, a rotational force resulting from the tension with which the webbing is drawn out is imparted to the drum base member 18, but this rotational force is small and the rotation of the drum 18 is prevented by the spring 28. Accordingly, the drum 18 does not come near the plate 26. This state is shown in FIG. 2.

However, during the emergency, as already described, the shaft 4 is locked and a tension above a predetermined value is imparted to the webbing W and therefore, a great counterclockwise rotational force is imparted to the drum base member 16, which thus overcomes the biasing force of the spring 28 and starts rotating. Simultaneously with rotation of the drum base member, the bar 25 is brought into engagement with the projection 27. Accordingly, the plate 22 integral with the bar 25 moves downwardly, whereby the second lock plate 21 comes into mesh engagement with the ratchet wheels 19 and 20. This is shown in FIG. 3.

When it comes into mesh engagement with the ratchet wheels 19 and 20, the lock plate 21 strikes against the tooth surface of the ratchet wheels 19 and 20 and complete mesh engagement is established between the lock plate 21 and the ratchet wheels 19, 20, whereby rotation of the drum 18 is locked. At the same time, the webbing W is held between the holding plate 26 and the drum 18 and therefore, substantially simultaneously with the shaft 4 being locked, the webbing W is restrained between the holding plate 26 and the drum 18. Thus, continued drawing out of the webbing as the retractor is locked is restrained quickly, reliably and completely without the webbing being tightened on the shaft 4.

Now, since the second lock plate 21 and the ratchet wheels 19, 20 are not synchronized with each other, there is a possibility that their tooth tops strike against each other, but if the projection 27 or the bar 25 engaged with the projection 27 is formed of a flexible material, the tooth tops will be able to become smoothly engaged with each other without any unreasonable force being applied thereto.

According to the present invention, as has been described above, there is provided a locking device for safety seat belts which is simple in construction and reliable in operation.

I claim:

1. A locking device for holding the webbing of a seat belt against movement when a retractor for the seat belt has been locked during an emergency, said device comprising a base member having a holding portion, a support member held pivotally to said base member and carrying a rotatable drum movable towards said holding portion, the webbing of said seat belt extending from said retractor and partially around said drum whereby upon locking of said retractor during an emergency continued tension on said seat belt pivots said support member towards said holding portion to hold said webbing between said drum and said holding portion, and co-acting means formed on said base member and said support member for locking said drum against rotation as a result of the pivotal movement of said support members towards said holding portion, said co-acting means including an engagement member formed integrally with said drum for rotation therewith, a lock member mounted to said base member and adapted to move between a first position engaging said engagement member for holding said drum against rotation and a release position allowing rotation of said drum, said lock member being biased into its first position, an actuating member mounted on said support member for moving said lock member between its two positions, and actuation means secured to said base member for engaging said actuating member to move said lock member into its engagement position as a result of pivotal movement of said support member towards said holding portion.

2. A locking device according to claim 1, the portion of said actuating member engaging said actuation means being formed of a flexible material.

3. A locking device according to claim 1, the portion of said actuation means engaging said actuating member being formed of flexible material.

4. A locking device according to claim 1, including means for urging said support member away from said holding portion.

5. A locking device according to claim 4, including a stopper formed on said base member, said urging means urging said support member into engagement with said stopper.

6. A locking device according to claim 1, said retractor being mounted to said base member.

7. A locking device according to claim 1, said lock member being mounted on said actuating member whereby said lock member assumes its two positions by movement of said actuating member.

8. A locking device according to claim 1, said lock member being a plate and said engagement member including respective ratchet wheels secured to each axial end of said drum.

* * * * *